US011846607B2

(12) United States Patent
Liu et al.

(10) Patent No.: US 11,846,607 B2
(45) Date of Patent: Dec. 19, 2023

(54) METHOD OF IDENTIFYING DELAMINATION DAMAGE OF ARC-SHAPED COMPOSITE LAMINATE

(71) Applicant: Taiyuan University of Technology, Taiyuan (CN)

(72) Inventors: Peng Liu, Taiyuan (CN); Chaozhu Fan, Taiyuan (CN); Han Wang, Taiyuan (CN); Fujiang Cui, Taiyuan (CN); Zhiqiang Li, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 0 days.

(21) Appl. No.: 18/340,878

(22) Filed: Jun. 25, 2023

(65) Prior Publication Data
US 2023/0333065 A1    Oct. 19, 2023

(30) Foreign Application Priority Data

Jul. 6, 2022    (CN) .......................... 202210789110.5

(51) Int. Cl.
*G01N 29/07* (2006.01)
*G01N 29/44* (2006.01)
*G01N 29/04* (2006.01)

(52) U.S. Cl.
CPC .......... *G01N 29/07* (2013.01); *G01N 29/041* (2013.01); *G01N 29/4472* (2013.01); *G01N 2291/011* (2013.01); *G01N 2291/0231* (2013.01)

(58) Field of Classification Search
CPC .. G01N 29/07; G01N 29/041; G01N 29/4472; G01N 2291/011; G01N 2291/0231
See application file for complete search history.

(56) References Cited

U.S. PATENT DOCUMENTS

| 2011/0104433 | A1  | 5/2011 | Johnson et al. |
| 2011/0220006 | A1* | 9/2011 | Kaye ........................ B64C 3/185 |
| | | | 428/192 |
| 2011/0223400 | A1* | 9/2011 | Li ............................ B32B 7/12 |
| | | | 428/215 |

FOREIGN PATENT DOCUMENTS

| CN | 108344802 A | * | 7/2018 |
| CN | 109632958 A | * | 4/2019 |

(Continued)

OTHER PUBLICATIONS

Trendafilova "Damage assessment based on general signal correlation. Application for delamination diagnosis in composite structures", pp. 197-204, vol. 49, Jan.-Feb. 2015 (Year: 2014).*

(Continued)

*Primary Examiner* — Michael J Dalbo
*Assistant Examiner* — Kaleria Knox
(74) *Attorney, Agent, or Firm* — Zhigang Ma

(57) ABSTRACT

The present disclosure discloses a method of identifying delamination damage of an arc-shaped composite laminate, and belongs to the technical field of delamination damage identification. According to the method, an elliptical loci method and a fitted normal PDF for damage imaging are probabilistically integrated under a Bayesian framework. A plurality of characteristics sensitive to damage can be reasonably fused, known prior information is combined with measured time of flight (ToF) data, and the posterior distribution of unknown parameters is sampled by using a Markov Chain Monte Carlo (MCMC) algorithm, so that the reliability of damage location is improved, and the applicability of Lamb waves in damage location of plate structures is enhanced. In addition, the present disclosure can accurately identify the delamination damage of the arc-shaped composite laminate by processing the measured time of (Continued)

flight (ToF), and the absolute positioning error is less than 1 cm.

3 Claims, 5 Drawing Sheets

(56) References Cited

FOREIGN PATENT DOCUMENTS

| CN | 110376282 A | * | 10/2019 | ........... G01N 29/041 |
|----|-------------|---|---------|-------------------------|
| CN | 110687208 A | * | 1/2020 | |
| CN | 112179990 A | * | 1/2021 | |
| EP | 1995592 A1 | * | 11/2008 | ........... G01N 29/069 |
| WO | WO-2019201144 A1 | * | 10/2019 | ........... H04L 5/0048 |
| WO | WO-2020000833 A1 | * | 1/2020 | ........... G01N 29/041 |

OTHER PUBLICATIONS

CNIPA, Notification of First Office Action for Chinese application CN202210789110.5, dated Aug. 16, 2022.
CNIPA, Notification to grant patent right for Chinese application CN202210789110.5, dated Aug. 29, 2022.

* cited by examiner

METHOD OF IDENTIFYING DELAMINATION DAMAGE OF ARC-SHAPED COMPOSITE LAMINATE

TECHNICAL FIELD

The present disclosure belongs to the technical field of delamination damage identification, and particularly relates to a method of identifying delamination damage of an arc-shaped composite laminate based on a Bayesian framework and a Lamb wave.

BACKGROUND

Composites have played an increasingly important role in the front-end scientific and technological fields such as automobiles, aerospace, national defense and military industry in recent years because of their high specific strength, low structural weight, corrosion resistance and excellent fatigue resistance. However, composites are widely used because of their superior properties, and at the same time, their complex failure mechanism and imperceptible damage have gradually attracted the attention of people. On the one hand, the damage mode and mechanism of composites are completely different from those of metal materials. On the other hand, internal damage will inevitably occur in the service process of composites. Fiber fracture, matrix debonding and fiber delamination of composites can pose a great threat to the safety and reliability of the whole structure. Especially in the initial stage of damage, the tiny damage inside the composite structure is unobservable. With the increase of service life, the internal fatigue damage becomes more and more serious, which will bring great threat to life and property safety of people when it develops to a certain extent. Therefore, it is particularly important to identify the damage in the early stage of the damage.

With the development of new sensor technology, the health monitoring technology of the composite structure based on the lamb wave technology has gradually exerted great advantages because of its long-distance propagation ability and high sensitivity to non-uniformity near the propagation path, and is considered as one of the most promising detection methods. At present, most detection methods based on the lamb wave are based on some characteristic parameters (such as speed, phase, amplitude, etc.) of the structural response signal to evaluate the health state of the structure. After years of development, the method can judge whether the structure is damaged and the approximate location of the damage, but further research is needed to achieve quantitative identification and accurately judge the location of the damage. In particular, composite laminates are usually not flat plates but arc-shaped plates with radians in practical engineering applications, which also brings great difficulties to the location of delamination damage of laminates.

SUMMARY

Aiming at the problem that the current Bayesian fusion method is not accurate in locating the edge damage of the sensor network, the present disclosure provides a method of identifying delamination damage of an arc-shaped composite laminate based on a Bayesian framework and a Lamb wave.

In order to achieve the above purpose, the present disclosure uses the following technical scheme.

A method of identifying delamination damage of an arc-shaped composite laminate based on a Bayesian framework and a Lamb wave is provided, comprising the following steps:

Step 1, arranging a sensor network on a composite to be detected to form a sensor path;

Step 2, detecting the propagation speed of a Lamb wave in all directions of the composite laminate, and judging the influence of the composite laminate on the propagation speed of Lamb wave signals;

Step 3, detecting the Lamb wave signals of each path on the composite laminate, and obtaining data of damaged path signals and undamaged path signals;

Step 4, analyzing the correlation between the damaged signal data and the undamaged signal data of each path to obtain the correlation DI therebetween;

Step 5, performing continuous wavelet transform on the scattered signal of each path to obtain the time of flight ToF of each path;

Step 6, processing the time of flight ToF, and converting the three-dimensional measurement data into a two-dimensional imaging plane;

Step 7, fusing a damage location algorithm using Bayesian principle to obtain a posterior distribution thereof, taking correlation DI and time of flight ToF as inputs, and sampling the fused posterior distribution by using a Markov Chain Monte Carlo (MCMC) algorithm to obtain the distribution of position parameters (x, y);

Step 8: visualizing the position parameters (x, y) to obtain the final damage location.

Further, the specific method of arranging the sensor network in Step 1 comprises arranging four sensors within a quarter circle with a signal transmitter as the center and the radius of 125 mm.

Further, the specific method of detecting the propagation speed of a Lamb wave in all directions of the composite laminate in Step 2 comprises performing continuous wavelet transform on the received signals to obtain the propagation time of waves in all directions, and then obtain the propagation speed of waves in all directions by dividing the distance between the signal transmitter and the receiver by the propagation time.

Further, analyzing the correlation in Step 4 is denoted as:

$$DI = \frac{\sum_{k=1}^{K}(X_k - \mu_k)(Y_k - \mu_y)}{\sqrt{\sum_{k=1}^{K}(X_k - \mu_k)^2}\sqrt{\sum_{k=1}^{K}(Y_k - \mu_k)^2}}$$

where DI denotes correlation, $X_k$ is the signal of an undamaged plate receiver, $Y_k$ is the signal of a damaged plate receiver, $\mu_x$ is the mean of $X_k$, $\mu_y$ is the mean of $Y_k$, K is the total number of data recording points, and k is the number of data recording points; the greater the value of DI, the smaller the probability of damage, whereas the smaller the value of DI, the greater the probability of damage.

Further, the specific method of performing continuous wavelet transform on the scattered signal of each path to obtain the time of flight ToF of each path in Step 5 comprises the following steps:

obtaining the scattered signal of the path by the difference between the damage/baseline signals, and then performing continuous wavelet transform (CWT) on the scattered signal and an excitation signal, wherein the difference between first peak times after performing continuous wavelet transform on the scattered signal and the excitation signal is the time of flight ToF, which is denoted as:

(a first peak time after performing continuous wavelet transform on the excitation signal−a first peak time after performing continuous wavelet transform on the scattered signal)=time of flight ToF Further, the specific method of processing the time of flight ToF in Step 6 comprises multiplying the measured time of flight ToF by the ratio of the length of each path on the two-dimensional imaging plane to the length of each path on the actual arc-shaped plate, which is denoted as:

$$\frac{\text{the time of flight} \times \text{the length of each path on the two-dimensional imaging plane)}}{\text{the length of each path of the composite}}.$$

Further, the posterior distribution in Step 7 is obtained by obtaining a joint prior PDF according to a probability density function of a Reconstruction Algorism for Probabilistic Inspection of Damage (RAPID), then constructing a likelihood function according to the elliptical loci method, and finally performing probability fusion on the joint prior PDF and the likelihood function under a Bayesian framework.

Further, the joint prior PDF is obtained according to the probability density function of the Reconstruction Algorism for Probabilistic Inspection of Damage, which is denoted as:

$$p(\theta) = p(x_d, y_d) \cdot p(\sigma) = \frac{1}{\sigma N_p} \left( \sum \right)_{i=1}^{N_p} (1 - DI_i) \frac{\beta - R_i(x_d, y_d)}{\beta - 1}$$

where p denotes the prior PDF function, θ is an unknown parameter vector $(x_d, y_d, \sigma)$, σ denotes the standard deviation of a normal distribution, $N_p$ denotes the total number of paths from the transmitter to the receiver, i denotes i path from the transmitter to the receiver, $DI_i$ denotes the correlation coefficient on each path, $R_i$ denotes the probability distribution in the elliptical region of the i path, and β is a size parameter, and β>1, which controls the size of the influence area of the sensor path and takes 1.07;

the likelihood function is constructed according to the elliptical loci method to obtain the probability density function of a unknown parameter θ, which is denoted as:

$$h(\theta \mid D) = \frac{1}{\sqrt{2\pi\sigma^2}} \exp\left\{ -\frac{[T_i - T_i^{TH}(x_d, y_d)]^2}{2\sigma^2} \right\}$$

where h denotes the probability density function of the parameter θ, D denotes the measured ToF data, σ denotes the standard deviation of the normal distribution, $T_i$ is the ToF obtained from the measured scattered signal, and $T_i^{TH}(x_d, y_d)$ is ToF calculated by combining the theory of the damage location parameter $(x_d, y_d)$;

the joint distribution law is:

$$p(D \mid \theta) = \left( \prod \right)_{i=1}^{N_p} \frac{1}{\sqrt{2\pi\sigma^2}} \exp\left\{ -\frac{\left(\sum\right)_{i=1}^{N_p} [T_i - T_i^{TH}(x_d, y_d)]^2}{2\sigma^2} \right\}$$

according to Bayesian theory, the posterior probability density function of the parameter vector θ is obtained:

$$p(\theta|D) \propto p(D|\theta) \cdot p(\theta) = \frac{1}{\sigma^{N_p+1}} \left( \sum \right)_{i=1}^{N_p} (1 - DI_i) \frac{\beta - R_i(x_d, y_d)}{\beta - 1} \exp\left\{ -\frac{\left( \sum \right)_{i=1}^{N_p} [T_i - T_i^{TH}(x_d, y_d)]^2}{2\sigma^2} \right\}$$

Further, the visualization processing in Step 8 comprises constructing normal distributions to represent the distributions of position parameters x and y, respectively, and then fitting two normal distributions in two dimensions to obtain the final probability result of damage location.

Compared with the prior art, the present disclosure has the following advantages.

Based on the problem that the current Bayesian fusion method is not accurate in locating the edge damage of the sensor network, an improved Bayesian fusion method based on propagation characteristics of Lamb group velocity in different directions is proposed. The method considers the influence of anisotropy of composites when studying the propagation characteristics of Lamb waves on composite laminates.

The research objects of the existing damage location methods are flat composites, but in practical application, composite laminates are rarely ideal flat structures, and most of them are arc-shaped structures with certain radians. According to the present disclosure, the delamination damage location of the arc-shaped composite laminate is realized by carrying out two-dimensional transformation on the damage characteristics measured on the arc-shaped plate.

DETAILED DESCRIPTION OF THE EMBODIMENTS

Embodiment 1

Figure 1:
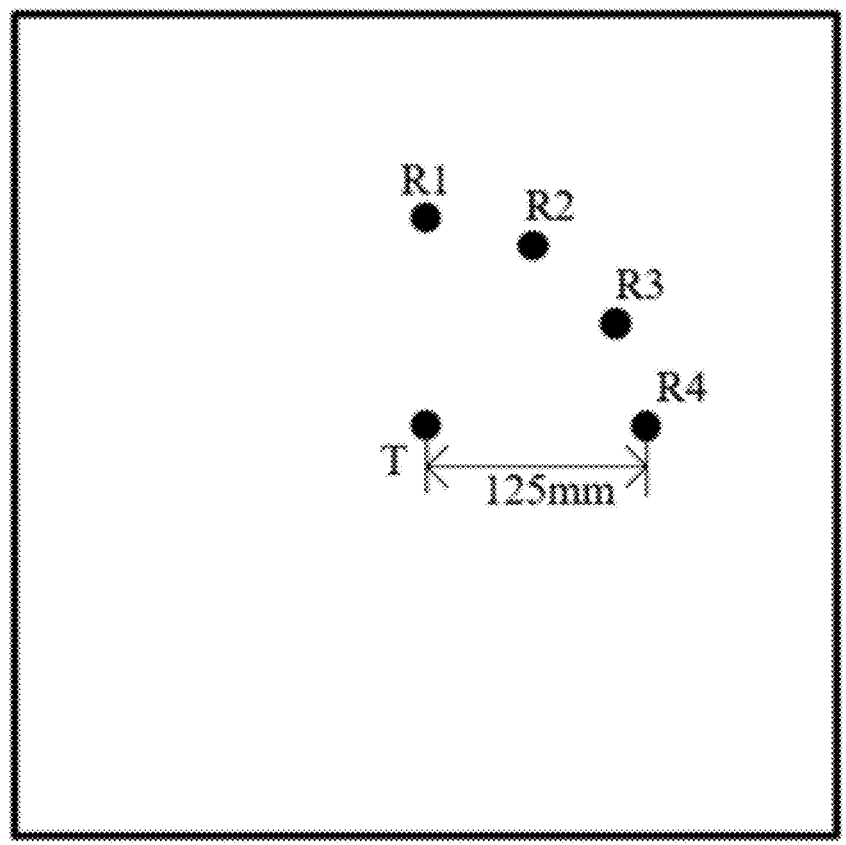
FIG. 1 is a schematic diagram of the propagation time of Lamb waves.
Figure 2:
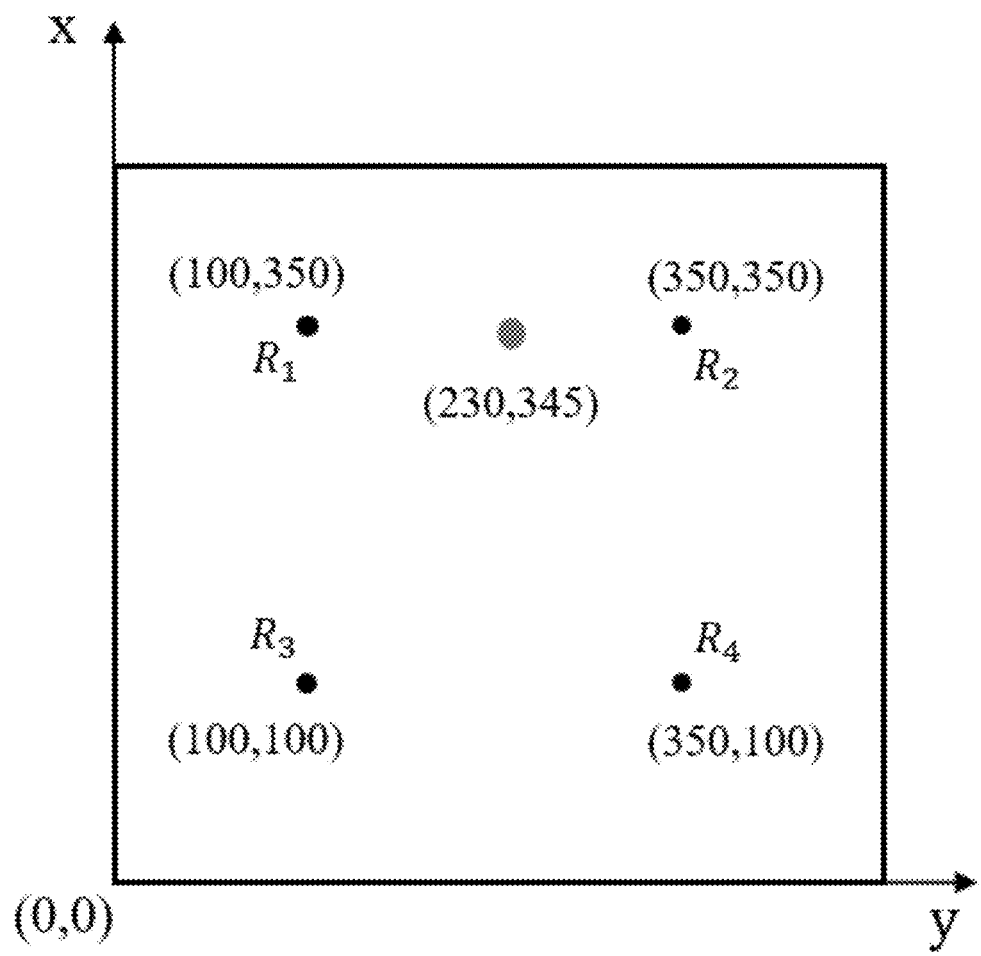
FIG. 2 is a schematic diagram of a sensor path.
Figure 3:
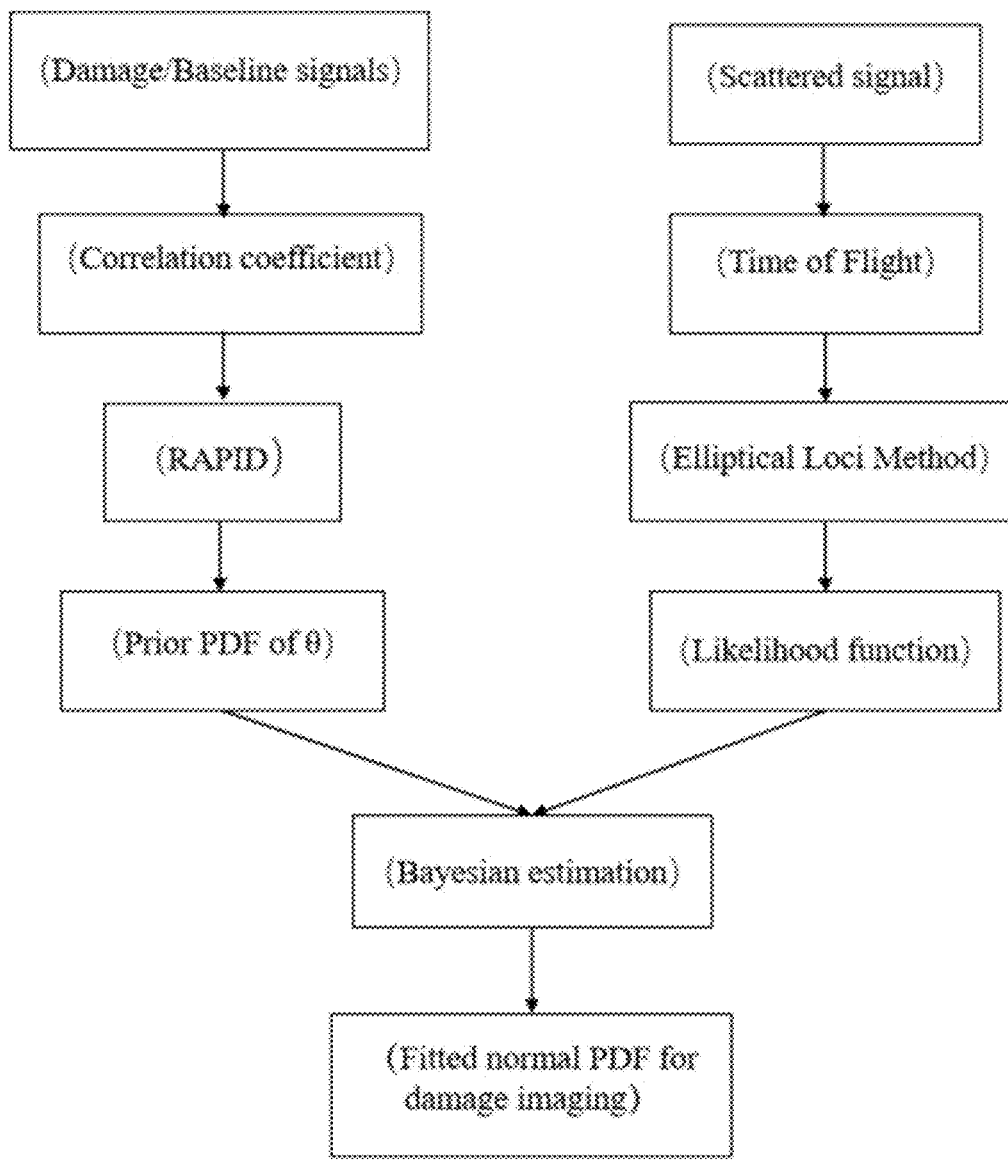
FIG. 3 is a schematic diagram of a damage location method based on a Bayesian framework.
Figure 4:
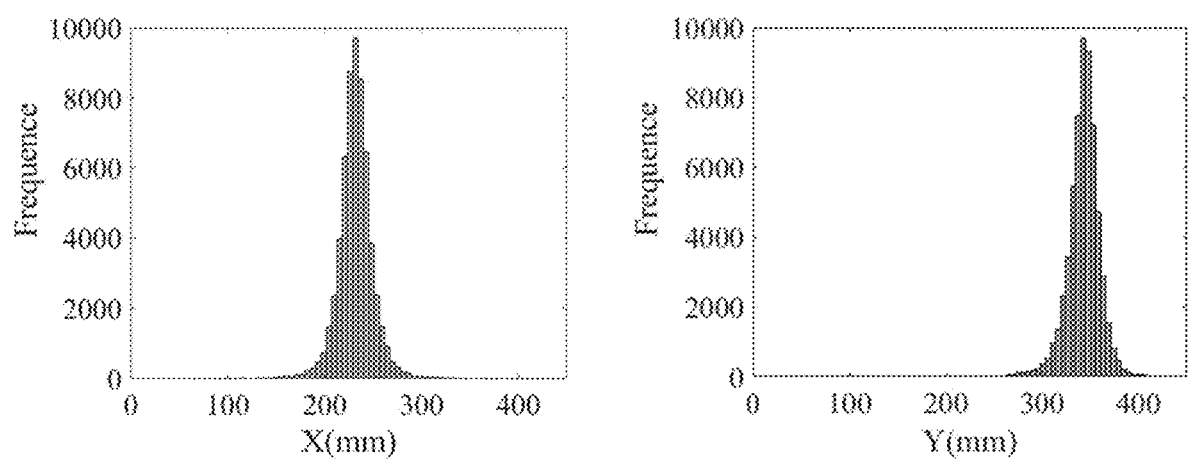
FIG. 4 is a frequency histogram of each parameter.
Figure 5:
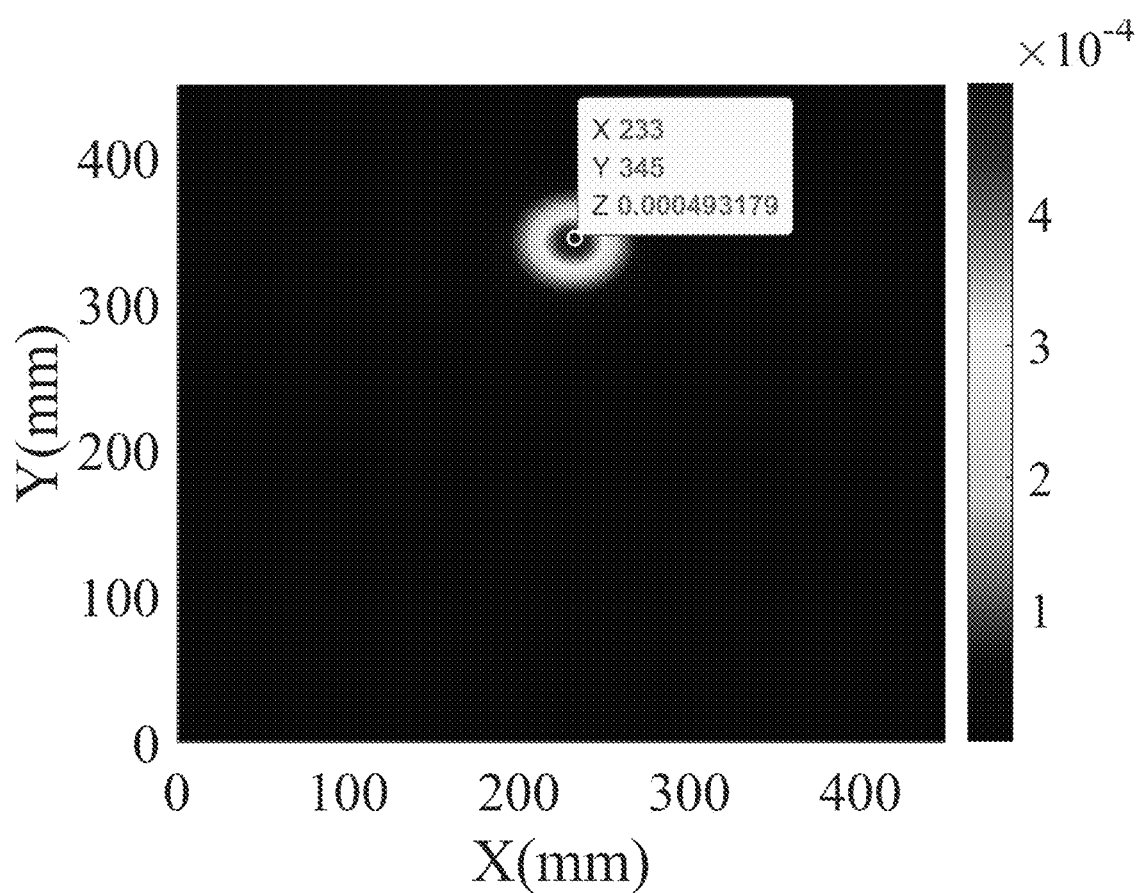
FIG. 5 is a schematic diagram of the damage location after visualization processing according to an embodiment.

A method of identifying delamination damage of an arc-shaped composite laminate based on a Bayesian framework and a Lamb wave is provided, comprising the following steps:

Step 1, arranging a sensor network on a composite to be detected to form a sensor path; wherein as shown in FIG. 1, T is a signal transmitter, and R1, R2, R3 and R4 are signal receivers;

Step 2, detecting the propagation speed of a Lamb wave in all directions of the composite laminate, and judging the influence of the composite laminate on the propagation speed of Lamb wave signals; wherein after performing the continuous wavelet transform on the received signal, the propagation time of waves in all directions is obtained, and then the propagation speed of waves in all directions can be calculated;

Step 3, detecting the Lamb wave signals of each path on the composite laminate, and obtaining data of damaged path signals and undamaged path signals; wherein the sensor arrangement is shown in FIG. 2;

Step 4, analyzing the correlation between the damaged signal data and the undamaged signal data of each path to obtain the correlation DI therebetween;

$$DI = \frac{(\sum)_{k=1}^{K}(X_k - \mu_x)(Y_k - \mu_y)}{\sqrt{(\sum)_{k=1}^{K}(X_k - \mu_x)^2}\sqrt{(\sum)_{k=1}^{K}(Y_k - \mu_y)^2}}$$

where DI denotes correlation, $X_k$ is the signal of an undamaged plate receiver, $Y_k$ is the signal of a damaged plate receiver, $\mu_x$ is the mean of $X_k$, $\mu_y$ is the mean of $Y_k$, K is the total number of data recording points, and k is the number of data recording points; the greater the value of DI, the smaller the probability of damage, whereas the smaller the value of DI, the greater the probability of damage;

Step 5, obtaining the scattered signal of the path by the difference between the damage/baseline signals, and then performing continuous wavelet transform on the scattered signal and an excitation signal, wherein the difference between first peak times after performing continuous wavelet transform on the scattered signal and the excitation signal is the time of flight ToF;

Step 6, processing the time of flight ToF, multiplying the measured time of flight ToF by the ratio of the length of each path on the two-dimensional imaging plane to the length of each path on the actual arc-shaped plate, and converting the three-dimensional measurement data into a two-dimensional imaging plane;

Step 7, fusing a damage location algorithm using Bayesian principle to obtain a posterior distribution thereof, taking correlation DI and time of flight ToF as inputs, and sampling the fused posterior distribution by using a Markov Chain Monte Carlo (MCMC) algorithm to obtain the distribution of position parameters (x, y);

obtaining the joint prior PDF according to the probability density function of the Reconstruction Algorism for Probabilistic Inspection of Damage, which is denoted as:

$$p(\theta) = p(x_d, y_d) \cdot p(\sigma) = \frac{1}{\sigma N_p}(\sum)_{i=1}^{N_p}(1 - DI_i)\frac{\beta - R_i(x_d, y_d)}{\beta - 1}$$

where p denotes the prior PDF function, $\theta$ is an unknown parameter vector $(x_d, y_d, \sigma)$, $\sigma$ denotes the standard deviation of a normal distribution, $N_p$ denotes the total number of paths from the transmitter to the receiver, i denotes i path from the transmitter to the receiver, $DI_i$ denotes the correlation coefficient on each path, $R_i$ denotes the probability distribution in the elliptical region of the i path, and $\beta$ is a size parameter, and $\beta > 1$;

constructing the likelihood function according to the elliptical loci method to obtain the probability density function of a unknown parameter $\theta$, which is denoted as:

$$h(\theta \mid D) = \frac{1}{\sqrt{2\pi\sigma^2}}\exp\left\{-\frac{[T_i - T_i^{TH}(x_d, y_d)]^2}{2\sigma^2}\right\}$$

where h denotes the probability density function of the parameter $\theta$, D denotes the measured ToF data, $\sigma$ denotes the standard deviation of the normal distribution, $T_i$ is the ToF obtained from the measured scattered signal, and $T_i^{TH}(x_d, y_d)$ is ToF calculated by combining the theory of the damage location parameter $(x_d, y_d)$;

the joint distribution law is:

$$p(D \mid \theta) = (\prod)_{i=1}^{N_p}\frac{1}{\sqrt{2\pi\sigma^2}}\exp\left\{-\frac{(\sum)_{i=1}^{N_p}[T_i - T_i^{TH}(x_d, y_d)]^2}{2\sigma^2}\right\}$$

obtaining the posterior probability density function of the parameter vector θ according to Bayesian theory:

$$p(\theta\mid D)\propto p(D\mid\theta)\cdot p(\theta)=\frac{1}{\sigma^{N_p+1}}\left(\sum\right)_{i=1}^{N_p}(1-DI_i)\frac{\beta-R_i(x_d,y_d)}{\beta-1}\exp\left\{-\frac{\left(\sum\right)_{i=1}^{N_p}[T_i-T_i^{TH}(x_d,y_d)]^2}{2\sigma^2}\right\}$$

extracting a total of 60,000 variable samples, setting the first 10,000 samples as aging data, obtaining a total of 50,000 samples to estimate the location of damage, and obtaining the frequency histogram of each parameter by sampling samples, as shown in FIG. 4;

Step 8: visualizing the position parameters (x, y), constructing normal distributions to represent the distributions of position parameters x and y, respectively, and then fitting two normal distributions in two dimensions to obtain the final damage location (233, 345), as shown in FIG. 5.

What is not described in detail in the specification of the present disclosure belongs to the prior art known to those skilled in the art. Although the illustrative specific embodiments of the present disclosure have been described above so as to help those skilled in the art to understand the present disclosure, it should be clear that the present disclosure is not limited to the scope of the specific embodiments. As long as various changes are within the spirit and scope of the present disclosure defined and determined by the appended claims, the changes are obvious to those skilled in the art, and all inventions and creations using the concept of the present disclosure are protected.

What is claimed is:

1. A method of identifying delamination damage of an arc-shaped composite laminate, comprising the following steps:

Step 1, arranging a sensor network on a composite to be detected to form a sensor path;

Step 2, detecting the propagation speed of a Lamb wave in all directions of the composite laminate, and judging the influence of the composite laminate on the propagation speed of Lamb wave signals;

Step 3, detecting the Lamb wave signals of each path on the composite laminate, and obtaining data of damaged path signals and undamaged path signals;

Step 4, analyzing the correlation between the damaged signal data and the undamaged signal data of each path to obtain the correlation DI (damage index) therebetween;

Step 5, performing continuous wavelet transform on the scattered signal of each path to obtain the time of flight ToF of each path;

Step 6, processing the time of flight ToF, and converting the three-dimensional measurement data into a two-dimensional imaging plane;

Step 7, fusing a damage location algorithm using Bayesian principle to obtain a posterior distribution thereof, taking correlation DI and time of flight ToF as inputs, and sampling the fused posterior distribution by using a Markov Chain Monte Carlo algorithm to obtain the distribution of position parameters (x, y);

Step 8: visualizing the position parameters (x, y) to obtain the final damage location;

the specific method of detecting the propagation speed of a Lamb wave in all directions of the composite laminate in Step 2 comprises performing continuous wavelet transform on the received signals to obtain the propagation time and the propagation speed of waves in all directions;

analyzing the correlation in Step 4 is denoted as:

$$DI = \frac{\left(\sum\right)_{k=1}^{K}(X_k - \mu_x)(Y_k - \mu_y)}{\sqrt{\left(\sum\right)_{k=1}^{K}(X_k - \mu_x)^2}\sqrt{\left(\sum\right)_{k=1}^{K}(Y_k - \mu_y)^2}}$$

where DI denotes correlation, $X_k$ is the signal of an undamaged plate receiver, $Y_k$ is the signal of a damaged plate receiver, $\mu_x$ is the mean of $X_k$, $\mu_y$ is the mean of $Y_k$, K is the total number of data recording points, and k is the number of data recording points; the greater the value of DI, the smaller the probability of damage, whereas the smaller the value of DI, the greater the probability of damage;

the specific method of performing continuous wavelet transform on the scattered signal of each path to obtain the time of flight ToF of each path in Step 5 comprises the following steps:

obtaining the scattered signal of the path by the difference between the damage/baseline signals, and then performing continuous wavelet transform on the scattered signal and an excitation signal, wherein the difference between first peak times after performing continuous wavelet transform on the scattered signal and the excitation signal is the time of flight ToF, which is denoted as: (a first peak time after performing continuous wavelet transform on the excitation signal–a first peak time after performing continuous wavelet transform on the scattered signal)=time of flight ToF the specific method of processing the time of flight ToF in Step 6 comprises multiplying the measured time of flight ToF by the ratio of the length of each path on the two-dimensional imaging plane to the length of each path on the actual arc-shaped plate, which is denoted as:

$$\frac{\text{the time of flight} \times \text{the length of each path on the two-dimensional imaging plane})}{\text{the length of each path of the composite}};$$

the posterior distribution in Step 7 is obtained by obtaining a joint prior PDF according to a probability density function of a Reconstruction Algorism for Probabilistic Inspection of Damage, then constructing a likelihood function according to the elliptical loci method, and finally performing probability fusion on the joint prior PDF and the likelihood function under a Bayesian framework;

the joint prior PDF is obtained according to the probability density function of the Reconstruction Algorithm for Probabilistic Inspection of Damage, which is denoted as:

$$p(\theta) = p(x_d, y_d) \cdot p(\sigma) = \frac{1}{\sigma N_p} \sum_{i=1}^{N_p} (1 - DI_i) \frac{\beta - R_i(x_d, y_d)}{\beta - 1}$$

where p denotes the prior PDF function, $\theta$ is an unknown parameter vector $(x_d, y_d, \sigma)$, $\sigma$ denotes the standard deviation of a normal distribution, $N_p$ denotes the total number of paths from the transmitter to the receiver, i denotes i path from the transmitter to the receiver, $DI_i$ denotes the correlation coefficient on each path, $R_i$ denotes the probability distribution in the elliptical region of the i path, and $\beta$ is a size parameter, and $\beta>1$;

the likelihood function is constructed according to the elliptical loci method to obtain the probability density function of a unknown parameter $\theta$, which is denoted as:

$$h(\theta \mid D) = \frac{1}{\sqrt{2\pi\sigma^2}} \exp\left\{-\frac{[T_i - T_i^{TH}(x_d, y_d)]^2}{2\sigma^2}\right\}$$

where h denotes the probability density function of the parameter θ, D denotes the measured ToF data, σ denotes the standard deviation of the normal distribution, $T_i$ is the ToF obtained from the measured scattered signal, and $T_i^{TH}(x_d, y_d)$ is ToF calculated by combining the theory of the damage location parameter $(x_d, y_d)$;

the joint distribution law is:

$$p(D \mid \theta) = \prod_{i=1}^{N_p} \frac{1}{\sqrt{2\pi\sigma^2}} \exp\left\{-\frac{(\sum)_{i=1}^{N_p}[T_i - T_i^{TH}(x_d, y_d)]^2}{2\sigma^2}\right\}$$

according to Bayesian theory, the posterior probability density function of the parameter vector θ is obtained:

$$p(\theta \mid D) \propto p(D \mid \theta) \cdot p(\theta) = \frac{1}{\sigma^{N_p+1}} \sum_{i=1}^{N_p} (1 - DI_i) \frac{\beta - R_i(x_d, y_d)}{\beta - 1} \exp\left\{-\frac{\left(\sum\right)_{i=1}^{N_p} [T_i - T_i^{TH}(x_d, y_d)]^2}{2\sigma^2}\right\}$$

2. The method of identifying delamination damage of the arc-shaped composite laminate according to claim 1, wherein the specific method of arranging the sensor network in Step 1 comprises arranging four sensors within a quarter circle with a signal transmitter as the center and the radius of 125 mm.

3. The method of identifying delamination damage of the arc-shaped composite laminate according to claim 1, wherein the visualization processing in Step 8 comprises constructing normal distributions to represent the distributions of position parameters x and y, respectively, and then fitting two normal distributions in two dimensions to obtain the final probability result of damage location.

* * * * *